Figure 1:
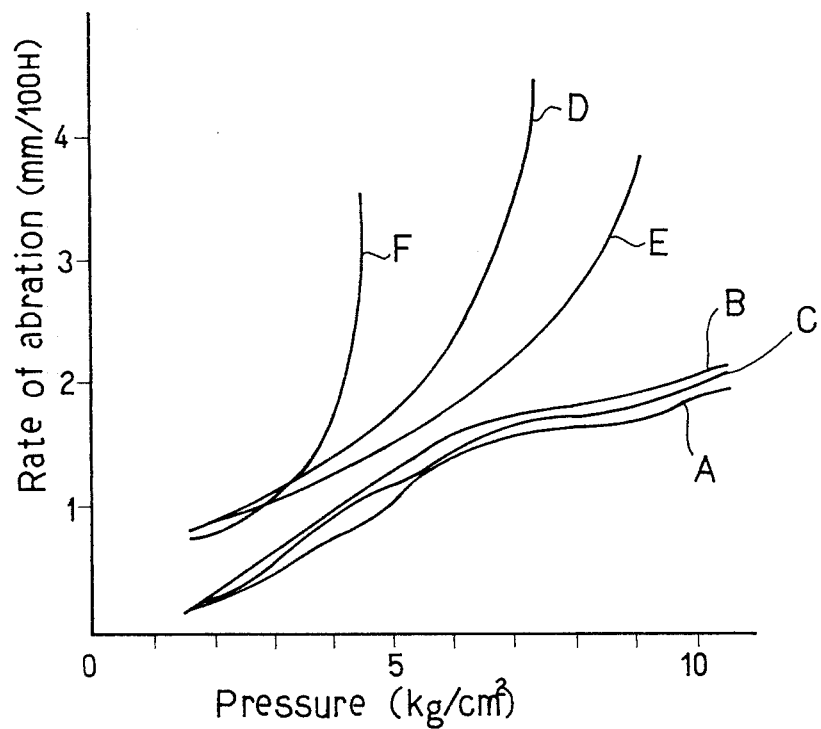

United States Patent [19]

Ikeda et al.

[11] Patent Number: 4,461,806
[45] Date of Patent: Jul. 24, 1984

[54] SHAPED ARTICLES OF NON-FIBROUS CARBONACEOUS MATERIAL

[75] Inventors: Shigeru Ikeda, Kawanishi; Shozi Hori, Takatsuki; Kiyohisa Eguchi, Kawanishi; Kanji Matsuo, Ikeda; Hidenori Zaima, Kanazawa; Yoshifumi Gamada, Neyagawa; Teruhisa Kondo, Toyonaka, all of Japan

[73] Assignees: Agency of Industrial Science & Technology; Kyowa Carbon Co., Ltd.; Toyo, Tanso Co., Ltd., all of Tokyo, Japan

[21] Appl. No.: 348,255

[22] Filed: Feb. 12, 1982

[30] Foreign Application Priority Data

Feb. 13, 1981 [JP] Japan ................................. 56-20346

[51] Int. Cl.³ ........................... B32B 9/00; B05D 3/02; C09K 3/14
[52] U.S. Cl. .................................... 428/408; 428/367; 428/427; 428/432; 428/410; 428/36; 427/374.7; 106/36; 422/307; 313/326
[58] Field of Search ............... 428/367, 408, 427, 432, 428/410

[56] References Cited

U.S. PATENT DOCUMENTS 3,914,508 10/1975 Hooten et al. ...................... 428/408
4,337,295 6/1982 Rittler ................................. 428/427
4,341,840 7/1982 Prewo ................................. 428/367

FOREIGN PATENT DOCUMENTS 1949830 4/1970 Fed. Rep. of Germany ...... 428/408
1471436 9/1972 Fed. Rep. of Germany ...... 428/408
2257863 5/1973 Fed. Rep. of Germany ...... 428/408

Primary Examiner—P. Ives
Attorney, Agent, or Firm—Buell, Blenko, Ziesenheim & Beck

[57] ABSTRACT

A shaped article of a carbonaceous material characterized in that the carbonaceous material is impregnated with a borosilicate glass comprising 25 to 50 wt. % of $SiO_2$ and 20 to 45 wt. % of $B_2O_3$ as effective components.

7 Claims, 1 Drawing Figure

SHAPED ARTICLES OF NON-FIBROUS CARBONACEOUS MATERIAL

This invention relates to shaped articles of carbonaceous material and a process for preparing the same, and more particularly to shaped articles of carbonaceous material impregnated with glass and a process for preparing such articles.

Shaped articles of carbonaceous material are made of carbon or graphite. Since such articles are prepared from carbonaceous materials, they have outstanding heat resisting characterisitics, especially great mechanical strength at high temperatures, good lubricity and high abrasion resistance, so that they are widely used as graphite electrodes, crucibles, heat generating members and sliding members and are also useful as machine parts for use in refining or working metals. However, shaped articles of carbonaceous material have the serious drawback of becoming consumed by being oxidized in the presence of oxidants at high temperatures and further the drawback of being highly permeable to gases and liquids (i.e. low impermeability). Additionally with increases in the speed at which machines are operated, it has been desired in recent years to provide sliding members having higher resistance to abrasion.

Accordingly various proposals have been made to give such shaped carbonaceous articles improved resistance to oxidation and abrasion, high impermeability, etc. As one of the proposals, it is known to impregnate a carbonaceous material with a glass of specific composition, i.e. a lead glass comprising 78.4% (by weight, the same as hereinafter unless otherwise specified) of PbO, 11.8% of $B_2O_3$, 7.8% of $SiO_2$ and 2% of $Na_2O$, or a borate glass comprising 50% of $B_2O_3$, 13% of $SiO_2$, 26% of $Na_2O$, 5% of $Al_2O_3$, 5% of CaO and 1% of MgO. However, shaped articles of the carbonaceous material impregnated with the lead glass are unstable and very susceptible to oxidation at high temperatures of above about 650° C., while they remain to be improved in abrasion resistance. Shaped articles of the carbonaceous material impregnated with the borate glass, although having slightly higher stability at high temperatures, are still unstable and prone to oxidation at temperatures exceeding about 800° C. They have somewhat improved but still insufficient resistance to abrasion. Furthermore, the carbonaceous material impregnated with the borate glass has low resistance to chemicals, with the result that the shaped article prepared from the material inevitably deteriorates easily when brought into contact with hot water or an aqueous acid or alkali solution.

Thus shaped articles of carbonaceous material still remain to be developed which are satisfactory in any of various properties, such as resistance to oxidation at high temperatures, impermeability, resistance to abrasion, resistance to chemicals, etc.

An object of the present invention is to provide a shaped article of carbonaceous material having high resistance to oxidation and outstanding stability even at high temperatures of above 800° C.

Another object of the invention is to provide a shaped article of carbonaceous material having greatly improved resistance to abrasion.

Another object of the invention is to provide a shaped article of carbonaceous material having high resistance to chemicals.

Another object of the invention is to provide a shaped article of carbonaceous material having high impermeability.

Still another object of the invention is to provide a shaped article of carbonaceous material which is outstanding in resistance to oxidation and chemicals and in impermeability and which has remarkably improved abrasion resistance.

Other features of the present invention will become apparent from the following description.

The present invention provides a shaped article of a carbonaceous material impregnated with a borosilicate glass which comprises 25 to 50% of $SiO_2$, 20 to 45% of $B_2O_3$ and the balance a third component.

The shaped article of the carbonaceous material of this invention is characterized in that the carbonaceous material is impregnated with a glass entirely different in composition from the conventional lead glass and borate glass. Because of this feature, the shaped article has the following advantages. The article of the invention has high resistance to oxidation and is therefore very stable even at high temperatures of above 800° C. The shaped article of the invention has much higher abrasion resistance than the shaped articles of a carbonaceous material impregnated with the conventional lead glass or borate glass. The article is further outstanding in properties such as impermeability, resistance to chemicals, etc. Accordingly the present article is very useful for a wide variety of applications as a graphite electrode, heat generating member, sliding member or a machine part for use in refining or working metals.

The carbonaceous material to be used in this invention is not particularly limited but can be any of conventional like materials, such as materials consisting predominantly of carbon and graphitic materials. Further the carbonaceous material is not particularly limited in shape but can be of any of various shapes, such as spherical, cylindrical, cubic and rectangular parallelepipidal shapes. The material is not limited by the application for which the resulting article is used but can be any of the carbonaceous materials heretofore used, for example, for graphite electrodes, heat generators, sliding members and machine parts for use in refining or working metals.

The glass to be used in this invention for impregnating the carbonaceous material is a borosilicate glass comprising 25 to 50% of $SiO_2$, 20 to 45% of $B_2O_3$ and the balance a third component. Examples of useful third components are glass components which are usually used, such as $R^1_2O$ (wherein $R^1$ is K, Na, Li or like monovalent metal), $R^2O$ (wherein $R^2$ is Ca, Ba, Mg or like bivalent metal), $R^3_2O_3$ (wherein $R^3$ is Al or like trivalent metal), $R^4O_2$ (wherein $R^4$ is Ti, Zr or like tetravalent metal), etc. Insofar as the borosilicate glass contains $SiO_2$ and $B_2O_3$ in the above-mentioned proportions, the content of the third component is not particularly limited, but it is generally preferable that the glass contains up to about 40% of the third component. According to the invention, it is suitable to use a borosilicate glass comprising 25 to 50% of $SiO_2$, 20 to 45% of $B_2O_3$ and 5 to 40% of the third component. More preferably the borosilicate glass comprises 25 to 50% of $SiO_2$, 20 to 45% of $B_2O_3$, 5 to 40% of $R^1_2O$ and O to 10% of at least one of $R^2O$, $R^3_2O_3$ and $R^4O_2$.

The borosilicate glass to be used in this invention is prepared easily by a known method, for example, by mixing together the desired components in the specified proportions, fully melting the mixture and slowly or rapidly cooling the melt.

The shaped article of this invention is produced easily by impregnating a carbonaceous material with the glass. The amount of the glass impregnating the material is not definite but is variable, for example, in accordance with the use of the product. Generally the desired result can be achieved when the glass is applied in an impregnating ratio of about 10 to about 70%. The term "impregnating ratio" refers to the ratio to which the pores in the carbonaceous material are filled with the glass, assuming that the overall volume of the pores is 100%. When the shaped carbonaceous article is used as a graphite electrode, it is desirable that the article be impregnated with the glass in a ratio of at least about 10% and covered with the glass substantially over the entire surface thereof. Insofar as the surface of the article is covered with the glass substantially entirely, the characteristics required of the graphite electrode will not be impaired even if the impregnating ratio exceeds about 10%. Further when the shaped article is used as a sliding member, it is preferred that the article be impregnated with the glass in a ratio of at least about 30% uniformly throughout its interior.

The shaped carbonaceous article of the invention can be produced by any of various known processes provided that the carbonaceous material can be impregnated with the desired amount of glass. It is not always necessary but preferable to remove air from the pores in the carbonaceous material first and thereafter impregnate the material with a melt of borosilicate glass. The carbonaceous material can be degassed, for example, by subjecting the material to a vacuum. The material may be impregnated with the glass under atmospheric pressure or increased pressure.

Described below is a preferable mode of process for preparing a shaped article of carbonaceous material according to the invention. First, a carbonaceous material is held in an upper portion of a pressure container, and borosilicate glass is placed in a low portion of the container. Subsequently the container is evacuated and then heated to melt the glass. The carbonaceous material is thereafter immersed in the molten glass and thereby impregnated with the glass. The evacuation step degasses the pores of the material, prevents the material from oxidation and further facilitates the following impregnating step. The degree of vacuum to be produced by evacuation is not particularly limited but is widely variable suitably. Usually it is about $10^{-3}$ to about 150 mm Hg, preferably $10^{-2}$ to 100 mm Hg, more preferably $10^{-2}$ to 50 mm Hg. The heating temperature, which is variable, for example, according to the composition of the borosilicate glass used, is usually about 900° to about 1300° C., preferably 100° to 1200° C., more preferably 1100° to 1150° C. According to the invention, it is desirable to heat the container at a rate of about 3 to about 10° C./min. The period of time during which the carbonaceous material is held immersed in the molten glass is usually about 5 to about 120 minutes, preferably 30 to 100 minutes, more preferably 60 to 90 minutes, although not limited specifically. The amount of glass impregnating the carbonaceous material can be increased, for example, by injecting an inert gas, such as nitrogen gas, argon gas or a mixture thereof, into the pressure container and performing the impregnating step at an increased internal pressure of about 1 to about 150 atm. The pressure is variable suitably according to the contemplated use of the resulting product. After the impregnating step, the carbonaceous material is taken out from the container and allowed to cool spontaneously, and the glass deposit around the material is removed therefrom, whereby a shaped article of this invention is produced.

As described above, the amount of glass impregnating the carbonaceous material varies with the pressure applied for the impregnating step. For example when this step is performed at 1 atm., the resulting product has an impregnating ratio of about 5 to about 22%. Similarly when the impregnating step is performed at 10, 20, 30, 40 or 150 atm., the product has an impregnating ratio of about 35 to about 46%, about 39 to about 52%, about 48 to about 59%, about 51 to about 65%, or about 63 to about 76%.

For a better understanding of the present invention, examples are given below.

EXAMPLE 1

A carbonaceous material is used which has a bulk density of 1.601 g/cm$^3$, electric specific resistivity of 750 cm, bending strength of 78 kg/cm$^2$, compressive strength of 155 kg/cm$^2$, modulus of elasticity of 793 kg/mm$^2$ and porosity of 26.9 vol. %.

A borosilicate glass is used which comprises 38% of $SiO_2$, 36% of $B_2O_3$, 21% of $Na_2O$ and 5% of $Al_2O_3$ and has a softening point of 620° C.

A crucible (28 cm in diameter and 58 cm in length) of heat resisting alloy is placed into a pressure container (30 cm in diameter and 60 cm in length) having a Kanthal heat generating member incorporated therein. The carbonaceous material (15 cm in diameter and 24 cm in length) is placed into a cage made of heat resisting alloy and held in an upper portion of the crucible. The glass is placed on the bottom of the crucible. The container is then evacuated to 5 mm Hg and heated at a rate of about 5° C./min while measuring the temperature with a thermocouple inserted into the container through its bottom. The container is heated to 1050° C. and maintained at the same temperature. The cage is then lowered to immerse the carbonaceous material into the glass in a molten state. The vacuum pump is then stopped. Nitrogen gas is injected into the container so that the crucible has an internal pressure of 40 kg/cm$^2$. The container is thereafter maintained at the same temperature for 40 minutes. Subsequently the cage is raised, the internal pressure of the crucible is returned to 1 atm., and the carbonaceous material is withdrawn from the container and spontaneously cooled. The glass deposit on the surface of the material is removed therefrom, whereby a shaped carbonaceous article of this invention is obtained.

EXAMPLE 2

A shaped article of carbonaceous material is prepared according to the invention in the same manner as in Example 1 with the exception of using a borosilicate glass having a softening point of 581° C. and comprising 25% of $SiO_2$, 45% of $B_2O_3$, 25% of $Na_2O$ and 5% of CaO and heating the container to 1010° C. instead of heating to 1050° C.

EXAMPLE 3

A shaped article of carbonaceous material is prepared according to the invention in the same manner as in Example 1 with the exception of using a borosilicate glass having a softening point of 689° C. and comprising 50% of $SiO_2$, 30% of $B_2O_3$, 15% of $Na_2O$ and 5% of MgO and heating the container to 1120° C. instead of heating to 1050° C.

COMPARISON EXAMPLE 1

A shaped article of carbonaceous material is prepared in the same manner as in Example 1 with the exception of using a lead glass having a softening point of 390° C. and comprising 7.8% of $SiO_2$, 11.8% of $B_2O_3$, 2% of $Na_2O$ and 78.4% of PbO and heating the container to 730° C. instead of heating to 1050° C.

COMPARISON EXAMPLE 2

A shaped article of carbonaceous material is prepared in the same manner as in Example 1 with the exception of using a borate glass having a softening point of 538° C. and comprising 18% of $SiO_2$, 45% of $B_2O_3$, 26% of $Na_2O$, 5% of CaO, 5% of $Al_2O_3$ and 1% of MgO and heating the container to 880° C. instead of heating to 1050° C.

Table 1 shows various properties of the shaped articles obtained in Examples 1 to 3 and Comparison Examples 1 and 2. The bulk density listed is calculated from the weight and dimensions, in three directions, of the article concerned. The electric specific resistivity is measured by the voltage drop method. The bending strength is determined with use of a specimen, 5×10×40 mm, by a three-point bending test (spacing of 30 mm between support points). The compressive strength is determined with use of a specimen, 10×10×10 mm, by a compression test. The modulus of elasticity is measured by the ultrasonic resonance method. The porosity is given by $(d-do)/d \times 100$ where d is the real density of the specimen, and do is the bulk density of the specimen. The impregnating ratio is given by $(WG/d_G)/Ps \times 100$ where Ps is the porosity, WG is the weight of glass impregnated into the carbonaceous material, and $d_G$ is the specific gravity of the glass.

TABLE 1

|  | Example 1 | Example 2 | Example 3 | Comp. Ex. 1 | Comp. Ex. 2 |
|---|---|---|---|---|---|
| Bulk density (g/cm$^3$) | 1.99 | 2.06 | 2.00 | 2.48 | 2.00 |
| Electric specific resistivity (μΩ·cm) | 780 | 805 | 773 | 820 | 803 |
| Bending strength (kg/cm$^2$) | 196 | 189 | 195 | 165 | 171 |
| Compressive strength (kg/cm$^2$) | 339 | 363 | 347 | 325 | 353 |
| Modulus of elasticity (kg/mm$^2$) | 1809 | 1763 | 1810 | 1601 | 1807 |
| Porosity (vol. %) | 11.1 | 8.2 | 10.7 | 11.6 | 10.7 |
| Impregnating ratio (vol. %) | 58.9 | 69.4 | 60.4 | 56.7 | 60.1 |

Table 1 reveals that the shaped articles of the invention have considerably improved properties, indicating that the carbonaceous material has been impregnated with the borosilicate glass effectively.

The shaped articles prepared above are checked for resistance to oxidation (stability) at high temperatures by measuring the weight reduction of each specimen at 800° C., 850° C. or 900° C. by a thermobalance at an air flow rate of 50 cc/min and calculating the degree of oxidation from the measurement. Table 2 shows the results. For comparison, the carbonaceous material before impregnation is also similarly checked for oxidation resistance with the results listed in Table 2. Table 2 shows that the shaped articles of the invention have outstanding resistance to oxidation.

TABLE 2

| Specimen | Heating Temp. (°C.) | Time (min) | Oxidation degree (%) |
|---|---|---|---|
| Example 1 | 800 | 120 | 22.1 |
|  | 850 | 120 | 14.8 |
|  | 900 | 120 | 13.6 |
| Example 2 | 800 | 120 | 2.1 |
|  | 850 | 120 | 3.4 |
|  | 900 | 120 | 10.3 |
| Example 3 | 800 | 120 | 10.4 |
|  | 850 | 120 | 17.2 |
|  | 900 | 120 | 19.6 |
| Comp. Ex. 1 | 800 | 120 | 88.3 |
|  | 850 | 115 | 100 |
|  | 900 | 98 | 100 |
| Comp. Ex. 2 | 800 | 120 | 35.2 |
|  | 850 | 120 | 49.7 |
|  | 900 | 72 | 61.9 |
| Carbonaceous material | 800 | 103 | 100 |
|  | 850 | 94 | 100 |
|  | 900 | 87 | 100 |

To check the shaped articles prepared above for resistance to chemicals, each specimen is boiled in water, 5% aqueous solution of hydrochloric acid or 1N aqueous solution of sodium hydroxide for a specified period of time and thereafter tested for passage of air therethrough at air pressure of 5 atm. The results shown in Table 3 and 5 are according to the following criteria:

A: air permeable after boiling for 1 hour.
B: air permeable after boiling for 3 hours.
C: air impermeable even after boiling for 5 hours.

The impermeability of each of the article is expressed in terms of viscous permeability coeffecetin in Table 3, which for comparison also shows the corresponding value of the carbonaceous material before impregnation.

Table 3 shows that the articles of the invention are superior in chemical resistance and impermeability.

TABLE 3

|  | Chemical resistance | | | Viscous permeability coefficient |
|---|---|---|---|---|
|  | Water | 5% aq. soln. of HCl | 1N aq. soln. of NaOH |  |
| Ex. 1 | C | C | C | $5.5 \times 10^{-11}$ |
| Ex. 2 | C | C | C | $1.9 \times 10^{-11}$ |
| Ex. 3 | C | C | C | $8.5 \times 10^{-12}$ |
| Comp.Ex. 1 | B | B | B | $9.3 \times 10^{-12}$ |
| Comp Ex. 2 | A | B | A | $6.5 \times 10^{-12}$ |
| Carbonaceuous material | — | — | — | $2.5 \times 10^{-8}$ |

EXAMPLE 4

A carbonaceous material is used which has a bulk density of 1.623 g/cm$^3$, electric specific resistivity of 1430 μΩ.cm, bending strength of 263 kg/cm$^2$, compressive strength of 520 kg/cm$^2$, modulus of elasticity of 1026 kg/mm$^2$ and porosity of 24.1 vol. %.

The material is treated in the same manner as in Example 1 with use of the same borosilicate glass as used in Example 1 to obtain a shaped article according to the invention.

EXAMPLE 5

A shaped article of carbonaceous material is prepared according to the invention in the same manner as in Example 4 except that the same borosilicate glass as used in Example 2.

EXAMPLE 6

A shaped article of carbonaceous material is prepared according to the invention in the same manner as in Example 4 with the exception of using the same borosilicate glass as used in Example 3.

COMPARISON EXAMPLE 3

A shaped article of carbonaceous material is prepared in the same manner as in Comparison Example 1 with the exception of using the same carbonaceous material as used in Example 4.

COMPARISON EXAMPLE 4

A shaped article of carbonaceous material is prepared in the same manner as in Comparison Example 2 with the exception of using the same carbonaceous material as used in Example 4.

Table 4 shows various properties of the shaped articles obtained in Examples 4 to 6 and Comparison Examples 3 and 4.

TABLE 4

|  | Example 4 | Example 5 | Example 6 | Comp. Ex. 3 | Comp. Ex. 4 |
|---|---|---|---|---|---|
| Bulk density (g/cm$^3$) | 2.04 | 2.02 | 2.07 | 2.59 | 2.06 |
| Electric specific resistivity ($\mu\Omega$·cm) | 1546 | 1300 | 1315 | 1532 | 1497 |
| Bending strength (kg/cm$^2$) | 439 | 694 | 696 | 582 | 607 |
| Compressive strength (kg/cm$^2$) | 1448 | 1845 | 1662 | 1090 | 1210 |
| Modulus of elasticity (kg/mm$^2$) | 2103 | 2227 | 2122 | 1908 | 2099 |
| Porosity (vol. %) | 7.2 | 8.0 | 5.9 | 7.4 | 6.0 |
| Impregnating ratio (vol. %) | 70.3 | 67.0 | 75.4 | 69.1 | 73.7 |

Table 4 shows that the shaped articles of the invention have considerably improved properties, indicating that the carbonaceous material has been impregnated with the borosilicate glass effectively.

The shaped articles prepared above are tested for abrasion resistance by the following method. Each specimen is placed on the surface of a ring rotated by an electric motor and held against the ring under a pressure for 2 hours. The pressure applied to the specimen is thereafter increased stepwise upon lapse of every two hours. The length of the resulting abrasion is measured by a dial gauge (IDIV 1/1000 mm) to determine the rate of abrasion per 100 hours.

Test conditions
Material of ring: FC-20
Speed of rotation: 1790 r.p.m.
Peripheral speed: 8.46 m/sec.
Pressure: 1.7–10.0 kg/cm$^2$
Atmosphere: In atmosphere at room temperature.

The FIGURE shows the results. Curves A, B, C, D and E are the pressure-abrasion rate curves determined for the shaped articles obtained in Examples 4, 5, 6 and Comparison Examples 3 and 4, respectively. Curve F is the corresponding curve obtained for the carbonaceous material used. The FIGURE reveals that the shaped articles of the invention have a low abrasion rate and therefore high resistance to abrasion.

The shaped articles are further tested for resistance to chemicals and impermeability with the results given in Table 5 below.

TABLE 5

|  | Chemical resistance | | | Viscous permeability coefficient |
|---|---|---|---|---|
|  | Water | 5% aq. soln. of HCl | 1N aq. soln. of NaOH |  |
| Ex. 4 | C | C | C | 4.2 × 10$^{-12}$ |
| Ex. 5 | C | C | C | 1.5 × 10$^{-12}$ |
| Ex. 6 | C | C | C | 7.3 × 10$^{-12}$ |
| Comp.Ex. 3 | B | C | B | 4.3 × 10$^{-12}$ |
| Comp.Ex. 4 | A | A | A | 8.4 × 10$^{-13}$ |
| Carbonaceuous material | — | — | — | 1.4 × 10$^{-9}$ |

Table 5 shows that the articles of the invention are superior in chemical resistance and impermeability.

We claim:

1. A shaped article of a non-fibrous carbonaceous material wherein the non-fibrous carbonaceous material is impregnated with a borosilicate glass comprising 25 to 50 wt. % of $SiO_2$ and 20 to 45 wt. % of $B_2O_3$ as effective components.

2. A shaped article as defined in claim 1 wherein the borosilicate glass further comprises as a third component at least one compound selected from the group consisting of $R^1_2O$ wherein $R^1$ is one of monovalent metals including K, Na and Li, $R^2O$ wherein $R^2$ is one of bivalent metals including Ca, Ba and Mg, $R^3_2O_3$ wherein $R^3$ is one of trivalent metals including Al, and $R^4O_2$ wherein $R^4$ is one of tetravalent metals including Ti and Zr.

3. A shaped article as defined in claim 2 wherein the borosilicate glass contains the third component in an amount of 5 to 40 wt. %.

4. A shaped article as defined in any one of claims 1 to 3 which is used as a graphite electrode.

5. A shaped article as defined in any one of claims 1 to 3 which is used as a sliding member.

6. A shaped article as defined in any one of claims 1 to 3 which is used as a heat generating member.

7. A shaped article as defined in any one of claims 1 to 3 which is used as a machine part for use in refining or working a metal.

* * * * *

UNITED STATES PATENT AND TRADEMARK OFFICE
CERTIFICATE OF CORRECTION

PATENT NO. : 4,461,806
DATED : July 24, 1984
INVENTOR(S) : Shigeru Ikeda, et al.

It is certified that error appears in the above-identified patent and that said Letters Patent is hereby corrected as shown below:

Column 3, line 54, change "100°" to --1000°--.

Column 6, line 33, change "article" to --articles--.

Column 6, in TABLE 3, line 51, change "Carbonaceuous" to --Carbonaceous--.

Signed and Sealed this

Seventh Day of May 1985

[SEAL]

*Attest:*

DONALD J. QUIGG

*Attesting Officer*     *Acting Commissioner of Patents and Trademarks*